United States Patent
Ubidia et al.

(10) Patent No.: US 8,079,494 B2
(45) Date of Patent: Dec. 20, 2011

(54) DELIVERY SYSTEM

(75) Inventors: Fernando A. Ubidia, Ludlow, MA (US);
Aaron M. Stein, Middletown, CT (US);
John Lewis, Monson, MA (US)

(73) Assignee: Tandem Technologies, LLC, Ludlow, MA (US)

( * ) Notice: Subject to any disclaimer, the term of this patent is extended or adjusted under 35 U.S.C. 154(b) by 920 days.

(21) Appl. No.: 11/923,644

(22) Filed: Oct. 24, 2007

(65) Prior Publication Data

US 2008/0093371 A1    Apr. 24, 2008

Related U.S. Application Data

(60) Provisional application No. 60/853,901, filed on Oct. 24, 2006, provisional application No. 60/857,282, filed on Nov. 7, 2006, provisional application No. 60/915,731, filed on May 3, 2007.

(51) Int. Cl.
| | |
|---|---|
| B65G 59/04 | (2006.01) |
| B65H 3/08 | (2006.01) |
| G07F 11/10 | (2006.01) |
| A47J 11/10 | (2006.01) |

(52) U.S. Cl. ............ 221/211; 221/123; 221/278; 221/4; 221/9; 221/13; 221/150 R; 473/447; 294/64.1

(58) Field of Classification Search ................. 294/64.1; 221/211, 278, 4, 9, 13, 150 R, 133; 473/447
See application file for complete search history.

(56) References Cited

U.S. PATENT DOCUMENTS

| | | | |
|---|---|---|---|
| 2,655,242 | A | 10/1953 | Chaffin et al. |
| 2,840,270 | A | 6/1958 | Gore |
| 3,226,833 | A * | 1/1966 | Lemelson ..................... 33/783 |
| 3,391,265 | A | 7/1968 | Esche |
| 3,523,707 | A * | 8/1970 | Roth .............................. 294/65 |
| 3,743,340 | A * | 7/1973 | Williamann ................. 294/64.1 |
| 3,800,932 | A | 4/1974 | Dana |
| 4,351,518 | A | 9/1982 | Stievenart |
| 4,427,192 | A | 1/1984 | Kushmaul et al. |
| 4,494,743 | A | 1/1985 | Kushmaul et al. |
| 4,557,659 | A | 12/1985 | Scaglia |
| 4,850,627 | A * | 7/1989 | Franklin ........................... 294/2 |
| 5,240,139 | A * | 8/1993 | Chirnomas ...................... 221/2 |
| 5,267,483 | A * | 12/1993 | Torii et al. ................ 74/490.01 |
| 5,292,029 | A * | 3/1994 | Pearson ........................... 221/2 |
| 5,425,645 | A * | 6/1995 | Skovdal et al. ................ 439/23 |
| 5,513,116 | A | 4/1996 | Buckley et al. |
| 5,513,772 | A * | 5/1996 | Glaser .......................... 221/211 |
| 5,561,604 | A | 10/1996 | Buckley et al. |
| 5,571,258 | A * | 11/1996 | Pearson ...................... 221/211 |

(Continued)

FOREIGN PATENT DOCUMENTS

DE         2455673 A  *  5/1976

(Continued)

*Primary Examiner* — Gene O. Crawford
*Assistant Examiner* — Rakesh Kumar
(74) *Attorney, Agent, or Firm* — Leydig, Voit & Mayer, Ltd.

(57) ABSTRACT

A product delivery system for delivering a product from a storage area to a dispensing area, such as for use in a vending machine. The product delivery system may include a vacuum holding device, a robotic positioning system, a reel and cable system, and a controller. A feature is the provision of a picker head with a built-in vacuum generating source that may be carried by a robotically movable arm system.

28 Claims, 14 Drawing Sheets

U.S. PATENT DOCUMENTS

| | | | |
|---|---|---|---|
| RE35,743 E * | 3/1998 | Pearson | 221/2 |
| 5,787,825 A * | 8/1998 | Yaji et al. | 111/174 |
| 5,957,326 A | 9/1999 | Ostgaard | |
| 5,971,205 A | 10/1999 | Michaels et al. | |
| 5,988,717 A | 11/1999 | Foust | |
| 6,003,286 A | 12/1999 | Goodman | |
| 6,186,358 B1 | 2/2001 | Peteraf | |
| 6,253,955 B1 * | 7/2001 | Bower | 221/150 R |
| 6,345,850 B1 | 2/2002 | Foust | |
| 6,547,096 B1 | 4/2003 | Chirnomas | |
| 6,623,236 B1 | 9/2003 | Barnes | |
| 6,786,355 B2 * | 9/2004 | Chirnomas | 221/9 |
| 6,868,983 B2 | 3/2005 | Chirnomas | |
| 6,881,025 B2 * | 4/2005 | Illingworth et al. | 415/58.2 |
| 7,044,330 B2 | 5/2006 | Chirnomas | |
| 7,044,332 B2 * | 5/2006 | Giegerich et al. | 221/278 |
| 7,222,901 B2 * | 5/2007 | Gebauer et al. | 294/64.1 |
| 7,240,805 B2 | 7/2007 | Chirnomas | |
| 2003/0234259 A1 | 12/2003 | Selfridge et al. | |
| 2004/0079761 A1 | 4/2004 | Chirnomas | |
| 2007/0043469 A1 | 2/2007 | Draper | |

FOREIGN PATENT DOCUMENTS

| | | |
|---|---|---|
| DE | 2455673 A1 | 5/1976 |
| FR | 2597239 A1 | 10/1987 |
| WO | WO 99/12132 A1 | 3/1999 |
| WO | WO 2004/114233 A1 | 12/2004 |
| WO | WO 2008/137355 A1 | 11/2008 |

* cited by examiner

DELIVERY SYSTEM

CROSS-REFERENCE TO RELATED APPLICATIONS

This patent application claims the benefit of U.S. Provisional Patent Application No. 60/853,901, filed Oct. 24, 2006, U.S. Provisional Patent Application No. 60/857,282, filed Nov. 7, 2006, and U.S. Provisional Patent Application No. 60/915,731, filed May 3, 2007, which are each incorporated by reference in their entirety herein.

FIELD OF THE INVENTION

The present invention relates generally to delivery systems including, but not limited to, product delivery systems such as may be used for vending machines and the like, merely by way of example.

BACKGROUND

The dispensing process for vending varies according to the application. For example, a common dispensing process for bottled and canned beverage vending machines has motors for rotating an oscillator that, depending on the position and angle of rotation, will dispense the container (can or bottle) when activated. In some bottle and can vending machines, the oscillator type system is replaced with a Cartesian type system. The Cartesian type systems utilize a cup that is maneuvered horizontally and vertically to position the cup in front of the bottle or can. The bottle or can then falls into the cup, and the cup is maneuvered to a drop port where the bottle or can is dropped into a dispensing area.

Frozen food vending can present certain challenges to dispensing because some of the components required to activate the dispense mechanism are enclosed within the freezing compartment.

Vacuum systems have been used in frozen food dispensing environments to lift product from a bin for dispensing. The vacuum system approach may be used in conjunction with a Cartesian coordinate robotic positioning system for transporting product to the delivery chute. Examples may be seen in U.S. Pat. Nos. 7,044,330; 6,547,096; and 5,240,139.

Current vacuum systems are inefficient, complex, expensive, and cumbersome. Maintenance and assembly costs may also be high. In addition, large vacuum pumps are needed to overcome the inefficiencies of current vacuum systems. Typically, current vacuum systems require a picker head, vacuum pump, vacuum hoses, and vacuum breakers. The vacuum pump is located a substantial distance away from the picker head.

Furthermore, certain Cartesian coordinate robotic positioning systems may be limited in their ability to reach an entire intended range frequently produce jerking movements while moving product, which can result in unintentionally dropped product.

BRIEF SUMMARY OF THE INVENTION

The invention provides a product delivery system suitable for vending machine applications and the like that facilitates the retrieval of a product from a storage area and delivery of the product to a dispensing area for customer retrieval. The product delivery system may be comprised of a positioning system, a product holding device, and a controller to control the product delivery process. Some embodiments may include a cable and reel assembly.

The positioning system, which may be referred to as the robotic manipulator, may be a robotic linkage comprised of arm segments joined by rotational joints. Each rotational joint may be driven by a drive system which rotates the adjoining arm segment relative to the other arm segments to provide several degrees of freedom to the robotic manipulator.

The product holding device, which may be referred to as the vacuum picker head, may be joined at one extremity of the robotic manipulator. The opposite extremity of the robotic manipulator may be fixed to a structural member of the vending machine apparatus or the like by a suitable structure such as a rotational joint. In this manner, the vacuum picker head may be positioned by rotation of robotic manipulator arm segments.

The vacuum picker head may be a self-contained air vacuum pump assembly comprising a housing containing a vacuum pumping mechanism, a vacuum pump driving mechanism, such as a motor, and a suction cup. A vacuum may be generated by the vacuum pump such that when the picker head is positioned sufficiently close to a product, the suction cup may contact the product. A suction force may cause the product to be held securely by the vacuum picker head.

The present invention may also include a cable and reel device to lower and raise the vacuum picker head with respect to the position of the robotic manipulator. The cable may be spooled onto the reel to raise the vacuum picker head, and the cable may be unwound to lower the vacuum picker head. The cable may support the load of the vacuum picker head and the product the vacuum picker head is carrying. The cable may include a plurality of conductors that transmit electrical power to the vacuum picker head and transmit signals between the vacuum picker head and the controller. The cable may be fixed at one end to the rotating reel component, but may be electrically coupled to a stationary component adjacent to the reel by way of a slip ring conductor. In this manner, the reel may rotate freely without risk of damage or tangling of the cable at the coupling point.

The controller of the present invention may control the rotation of the robotic manipulator arm segments, the lowering and raising of the vacuum picker head, and the activation and deactivation of the vacuum pump contained within the vacuum picker head. The controller can utilize a method of monitoring the current draw of the vacuum pump to determine if a product is held by the vacuum pump while the vacuum pump is running. A detected increase in the current draw of the vacuum pump may indicate that a vacuum is being generated, and therefore, that a product is held by the vacuum picker. The controller may also be capable of ramping up and down the power delivered to the vacuum pump. In this way, any undesirable rotational movements of the vacuum picker head caused by starting or stopping the vacuum pump at full power are minimized sufficiently to be rendered negligible. Another feature of the controller may include the utilization of closed loop feedback to provide precise rotation of the arm segments about the joints of the robotic manipulator.

The present invention may provide an improved product delivery system for vending machine type applications and the like that is capable of increased precision, speed, range of motion, and flexibility over current systems.

The present invention can provide a product delivery system with improved vacuum pump efficiency.

The present invention can provide a product delivery system that substantially reduces occurrences of unintentional product drops.

The present invention may provide a product delivery system with a relatively small number of components, and offers an extremely efficient mechanical design.

The product delivery system may be economical to build and manufacture, may require a simplified assembly process to construct, may allow for increased serviceability, and may be more economical to refurbish.

DETAILED DESCRIPTION OF THE INVENTION

Figure 1:
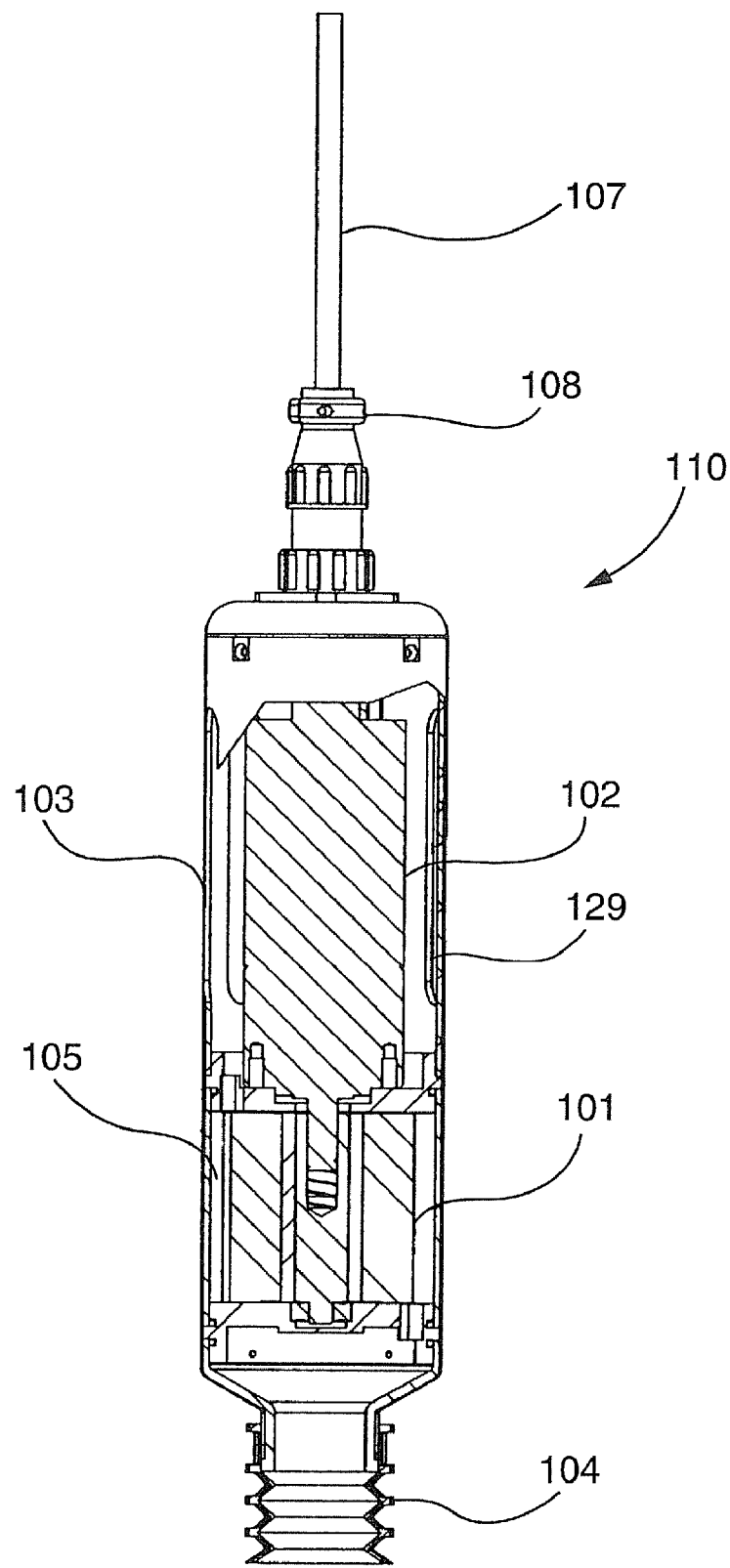
FIG. 1 is a partial cross-sectional view of a vacuum picker head portion.
Figure 2:
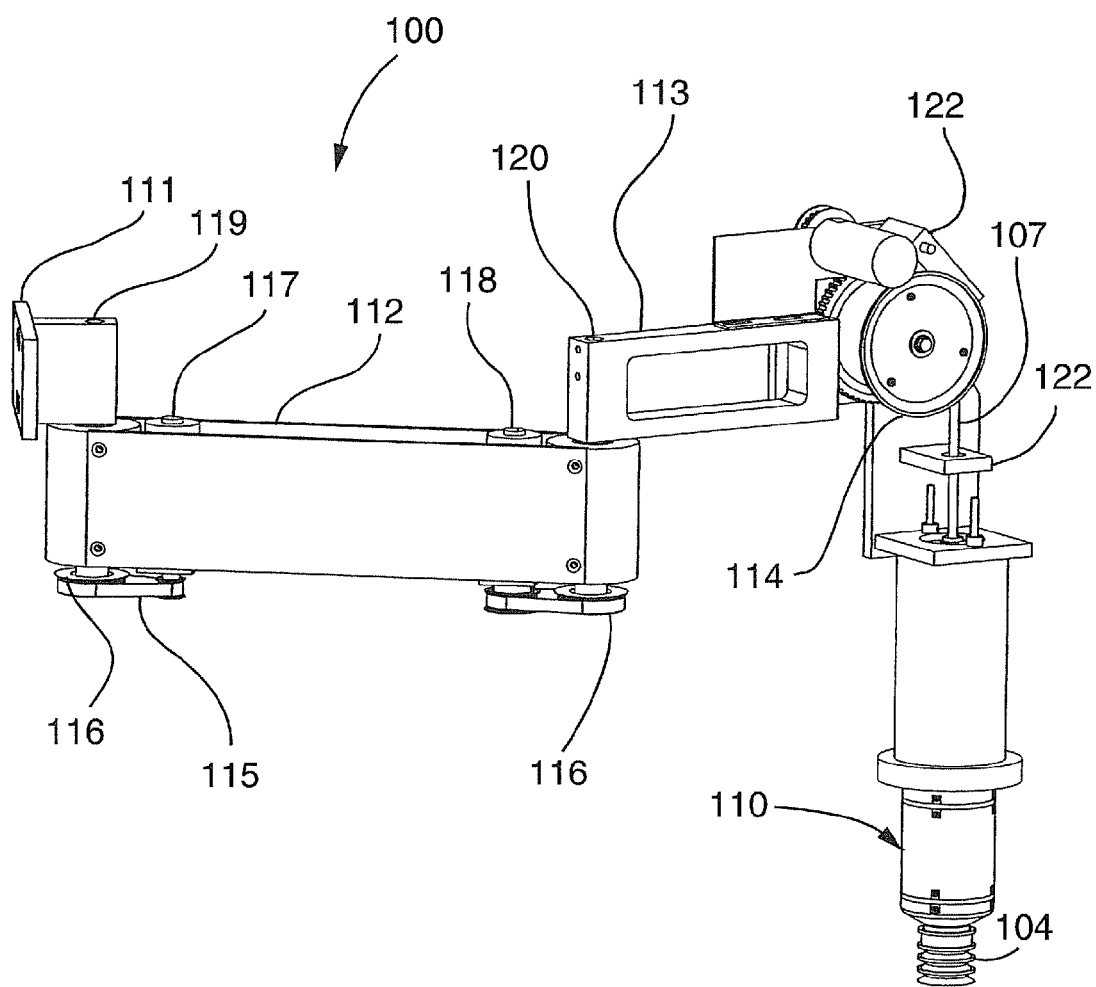
FIG. 2 is a perspective view of an embodiment of a delivery system including a robotic arm, cable and reel assembly, and vacuum picker head.

A delivery system is provided having a structure for applying a vacuum force against an object, such as a food product in a vending machine, in order to transport the object from an initial position to another position. The vacuum force may be created and applied by a suitable structure that may be carried along with the object. Referring to FIGS. 1 and 2, wherein like numerals may represent like features, FIG. 2 shows an embodiment of a delivery system 100 and FIG. 1 shows an embodiment of a product holding device in the form of a vacuum picker head assembly 106 that may be used with the delivery system of FIG. 2 to exert a vacuum force on an object.

Specifically referring to FIG. 1, the vacuum picker head assembly 110 may comprise a vacuum generator or pump with an impeller (or rotor) 101 and a driving motor 102 that may be integrated within the vacuum picker head assembly 110. the driving motor 102 may rotate the rotor to create a suction force. The vacuum pump 105 thus generates a suction force that holds onto a product when the suction cup 104 comes into contact with the product. The suction cup may be any suitable structure sufficient to allow for a vacuum force to be applied between the vacuum picker head assembly 110 and a product. In some embodiments, the suction cup may be a flexible such that is capable of conforming to a surface of the product to form a vacuum.

An example of a suitable vacuum pump type is a rotary vane type pump, however, other examples include, but are not limited to, vacuum pumps that may operate by centrifugal or positive displacement technology that may consist of rotary vane, roots type, and/or other positive displacement methods. Furthermore, it will be appreciated that the invention may be configured so that the vacuum pump system may consist of a plurality of pumps, in parallel or staged in series, and each pump may be of either similar or dissimilar vacuum technologies. In addition, each pump may run simultaneously or non-simultaneously with the other pumps. It will be appreciated that any suitable type of vacuum pump may be utilized.

The vacuum picker head 110 may be enclosed by a housing 103. All of the components needed to generate the suction force may be self-contained within the housing 103 such that the force is formed near the product being transported. The housing 103 may utilize one or more ventilation features 129 that direct the exhaust air from the vacuum pump back into the compartment, such as a refrigerated or non-refrigerated compartment of a vending machine, in which the product is stored. Thus, rather than drawing air out and away from the compartment, the delivery system may direct the exhaust air back into the compartment. In refrigerated air compartments, this exhaust system reduces the amount of refrigerated air loss from the refrigerated compartment during the dispensing cycle of the delivery system 100. Furthermore, having the vacuum pump 105 being self-contained within the compartment reduces the amount of noise from the operation of the vacuum pump 105 that is discernable to a user of the vending machine.

In some embodiments, the delivery system may utilize a cable 107 to lower and raise the vacuum picker head 110 during the dispensing cycle. The cable 107 may support both the load of the vacuum picker head 110 and product. Any electrical wiring used to power the vacuum motor 102, transmit signals from sensors, and power any other devices within the picker head, may be routed internally through the cable 107. The cable 107 can be attached to the vacuum picker 110 with an electrical connector 108 that provides electrical coupling between the vacuum picker electrical components and the cable 107. The connector 108 may provide a sound structural coupling between the vacuum picker 110 and the cable 107 so that the connector 108 supports the weight of the vacuum picker head 110 and product that it may be holding. Furthermore, the connector 108 may allow the vacuum picker head 110 to be detached and attached as a single assembly from the remainder of the product delivery system of the present invention.

The cable 107 can be flexible and may be structurally reinforced to support the weight of the vacuum picker head 110 and the product it may be holding. Other embodiments of the invention may use a cable track alone or in addition to a cable to provide additional load carrying capacity and torsion resistance.

FIG. 2 shows a robotic manipulator 131 of the delivery system 100. The robotic manipulator 131 may be a robotic arm. The robotic manipulator 131 may have a mount 111 that attaches to the vending machine cabinet or frame. The robotic manipulator 131 may be mounted in any of a variety of suitable locations within the vending machine to accommodate the particular requirements of the vending machine application. Furthermore, it will be appreciated that alternative embodiments of the invention may be configured such that the mount 111 may be mounted on a shaft, track, or other suitable positioning device so that additional degrees of freedom including vertical, horizontal, and/or rotational motion can be accomplished by the robotic manipulator.

The robotic manipulator of the delivery system 100 may include a main arm segment 112 that links to the mount 111 and pivots about a rotational joint 119 to provide a range of yaw rotation. A second arm segment 113 may be linked to the main arm segment and may be pivoted about an additional rotational joint 120 to provide a yaw range of rotation independent of the main arm segment 112. In this manner, the robotic manipulator 131 can extend into a long reach or fold back on itself to position the vacuum picker head 110 to any suitable position within a horizontal plane of a desired operating envelope.

The range of rotation and geometry of each arm may be configured to provide a suitable range of motion for the particular vending application. Furthermore, the robotic manipulator 131 may be configured to include additional arm segments and additional rotational joints, and may add further degrees of freedom of yaw rotation and rotational joints that provide pitch and roll rotation to position the vacuum picker head 110 to any suitable position of a three-dimensional space of a desired operating envelope. It will be appreciated that the robotic manipulator 131 may have any suitable number and type of arm segments and joints such that the robotic manipulator may move the vacuum picker head 110 in any suitable horizontal and/or vertical position within a three dimensional space. Additionally, the present invention may be configured with one or more arm segments that provide a telescoping motion to extend and retract in length and to move the vacuum picker head 110 to a desired position. The telescoping motion may be accomplished in any suitable manner, including, but not limited to pneumatic, hydraulic, and/or motor driven methods.

Figure 3:
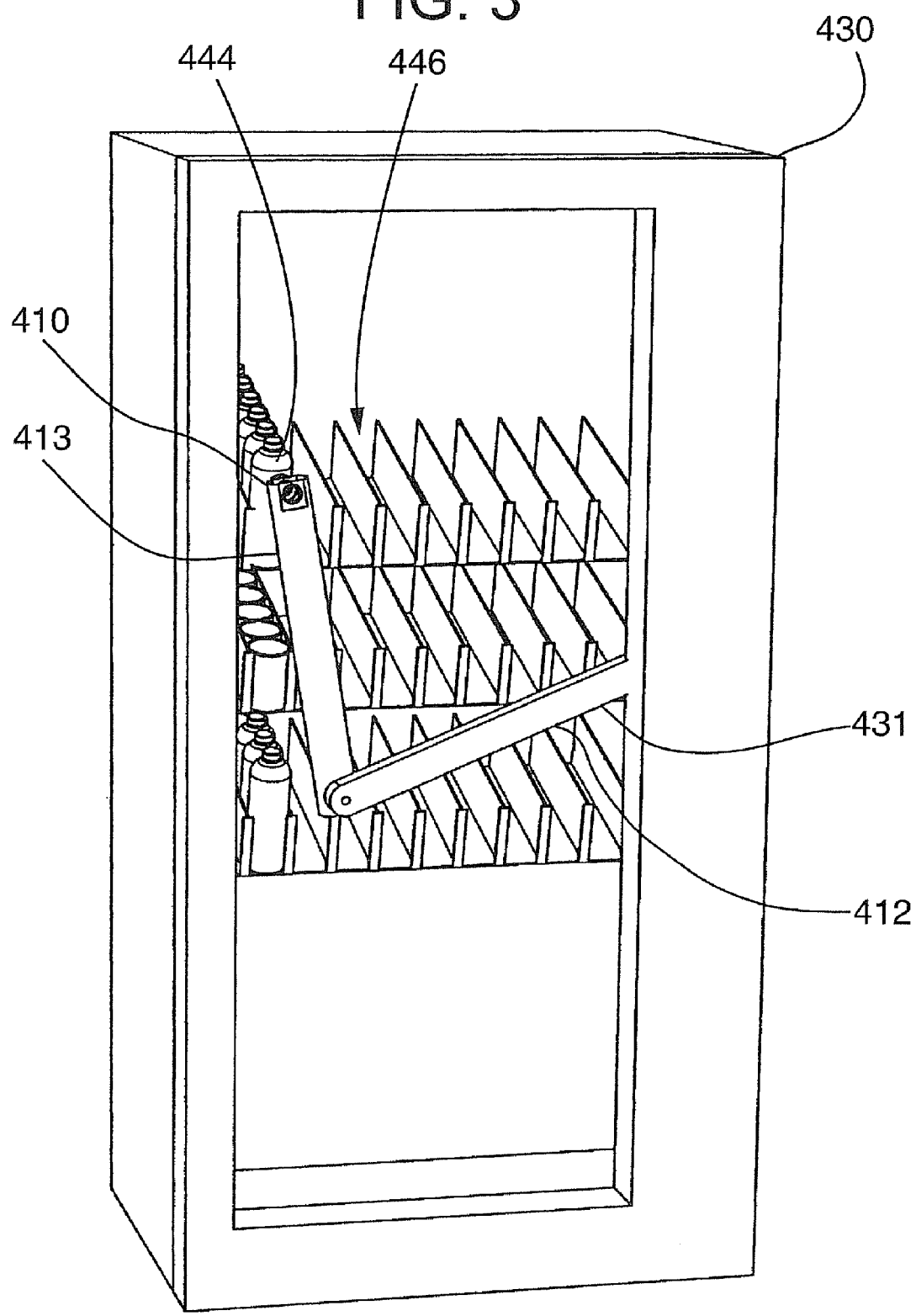
FIG. 3 is a perspective view of an embodiment of a delivery system utilized in a glass front vending machine.

FIG. 3 shows an embodiment of the delivery system utilized in a glass front vending machine 430 application. As shown, the vending machine may contain one or more racks 446 containing one or more products 444. The racks may be inclined such that when a product is removed, the next product slides forward. A robotic manipulator 431 may comprise a primary arm segment 412 and a second arm segment 413 that each provide a range of pitch rotation. A vacuum picker head 410 is attached near an end of the second arm segment 412.

In some embodiments, the delivery system may include structure that allows for setting the length of one or more of the arm segments of the robotic manipulator during the assembly process to suit the operational reach for a particular application. The length of each arm segment may be set to one of several predefined lengths, or the adjustment may be variable so that any suitable length may be set and limited maximally and minimally only by the physical length of the arm segment. The construction of the arm segment may include, but is not limited to: a telescopic system wherein an inner portion of arm segment resides within a tubular outer portion and the inner portion may slide within the outer portion to provide adjustability of the total length of the arm segment; or a track system wherein one portion of arm segment may be mounted by means of a track to the corresponding portion and can slide parallel with respect to the corresponding arm portion to provide adjustability of the total length of the arm segment. The two portions of the arm segment may be fixed into position once the desired arm segment length has been set by means of, but not limited to, a threaded setting, pin setting, spring loaded plunger, or interlocking geometric features of the respective arm segments.

Referring again to FIG. 2, in some embodiments, the rotation of each arm segment about its respective rotational joint may be driven by a motor 117, 118. The respective motor drives a belt 115 coupled to a pulley 116 to produce the rotation of the arm segments 112, 113. However, in alternative embodiments of the invention, other drive methods, such as, but not limited to, friction belt and pulley, chain and sprocket, pinion and gear, and/or other suitable structure may be used. Furthermore, the motor may be any suitable motor, including, but not limited to, AC or DC powered, stepper motors or servomotors, and/or may operate on feedback from encoders, resolvers, potentiometers, limit switches, proximity devices, and/or may be configured to employ a combination of such types of motor control technology.

The robotic manipulator may be integrated with user visible features to enhance the user experience and/or provide information to the user. By way of example and not limitation, the robotic manipulator may include one or more of the following: integrated lighting or other suitable visual displays, such as LED, fluorescent lighting, cold cathode lighting, neon, fiber optic, VFD/LCD displays, and/or any combination of the above.

Figure 4:
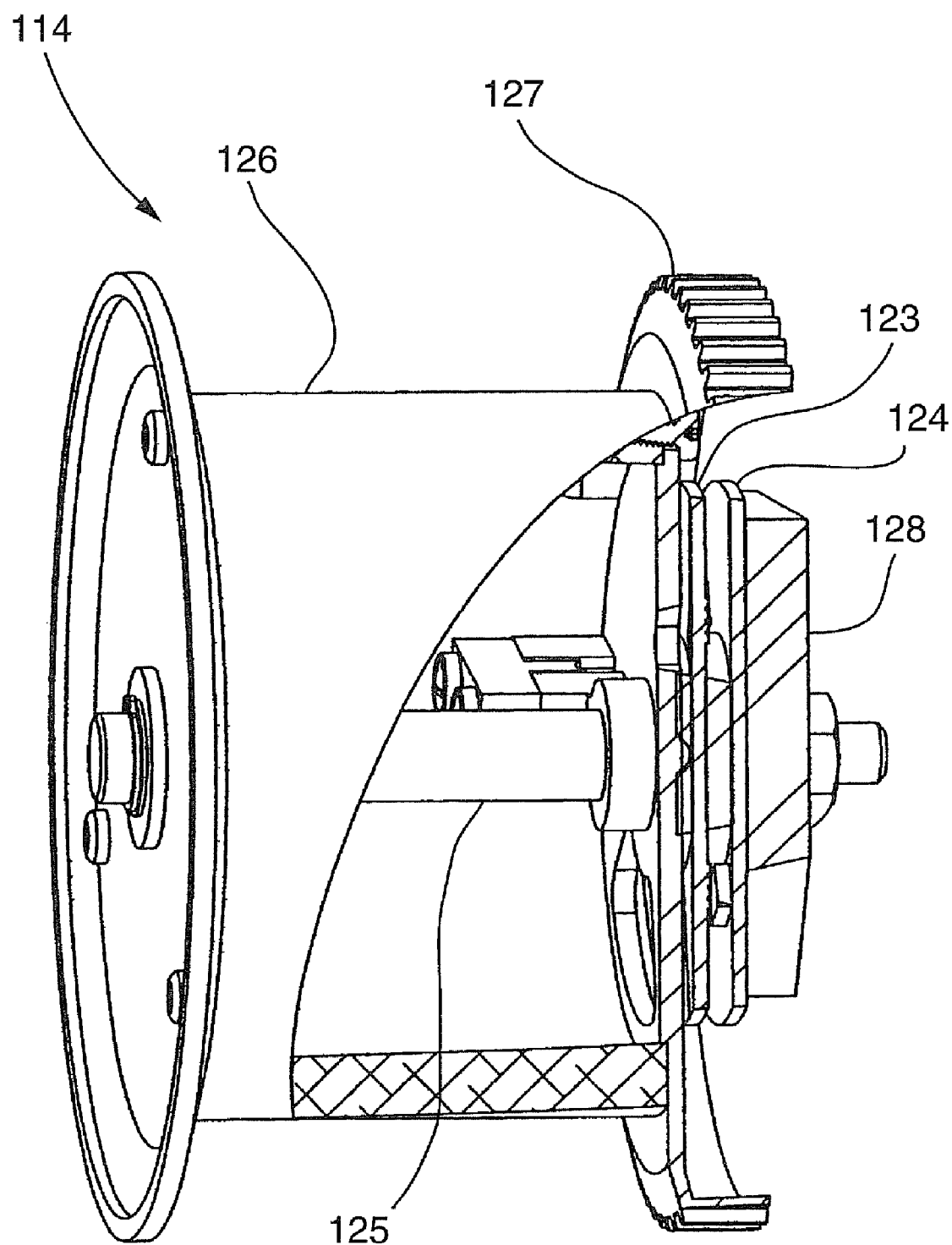
FIG. 4 is a partial sectional view of a reel assembly.

Some embodiments of the delivery system utilize a motor driven reel 114 to spool and unwind the cable 107 for raising and lowering the vacuum picker head 110. One or more guides 122 may be utilized to prevent the cable from tangling during the raising and lowering of the vacuum picker head 110. Referring to FIG. 4, slip ring conductors 123 and 124 electrically couple the cable between the rotating reel 127 and a stationary mounting component of the reel. As the reel is rotated, the cable may be spooled or unwound on a surface as indicated by 126. The cable may be wired to the rotating disc of the slip ring conductor 123. The stationary disc of the slip ring conductor is attached to a mounting bracket 128. The reel 114 and rotating slip ring conductor disc rotate about an axle 125. Configured as such, the reel may freely rotate to spool and unwind the cable 107 without risk of tangle or damage to the cable 107.

The delivery system may include a controller to control the power delivered to the drive mechanism of the robotic manipulator, the vacuum picker head, the reel, and/or any combination of the above. The controller may obtain positional feedback of the rotational motion of the robotic manipulator arm segments to thereby allow the delivery system to precisely position the robotic manipulator.

The controller may also include a feature for ramping up and down the power supplied to the vacuum pump of the vacuum picker. Ramping the power up during activation of the vacuum pump and ramping power down during deactivation of the vacuum picker may help minimize undesirable rotational movement of the vacuum picker head.

The controller may also monitor the electrical current drawn by the vacuum pump motor. The current drawn by the vacuum pump motor will increase when suction is created by a product being held by the vacuum picker head. Upon detection of the drawn current increase, a condition may be satisfied in the logic sequence of the controller, which indicates that a product is being held by the vacuum picker. In response, the controller may proceed with functions appropriate to the condition as defined in the programming of the logic of the controller. A microprocessor controlled sensing circuit may process feedback signals from the vacuum picker head.

In some embodiments, the controller may utilize pressure sensing devices such as, but not limited to, a pressure switch or pressure transducer located within the vacuum picker head. When product is being held by the picker head, the invention can detect the change in vacuum pressure via the pressure sensing device. Further embodiments of the delivery system may include a controller that utilizes optical or proximity sensors within the vacuum picker head to detect the presence of product.

The delivery system may be used in any suitable vending machine and including any of a multitude of vending machine enclosure sizes, styles, and configurations. The delivery system may be used to move any suitable product, including but not limited to, refrigerated food product, frozen food product, non-refrigerated food product, and product without packaging or in any suitable packaging such as, but not limited to, bags, boxes. It will be appreciated that the delivery system may also have broader application outside of vending machine applications. For example, the delivery system may have broader industrial use in applications such as, but not limited to, assembly operations. It will be appreciated that the delivery system may be utilized in any suitable application. Furthermore, the delivery system may utilize any suitable number of robotic manipulators and/or any suitable number of vacuum picker heads.

The delivery system may be configured to provide fully automatic vending so that the vacuum picker head and robotic manipulator complete the vending cycle without any customer feedback, or the delivery system may be configured to be manually operated fully or in part by the customer.

Figure 5:
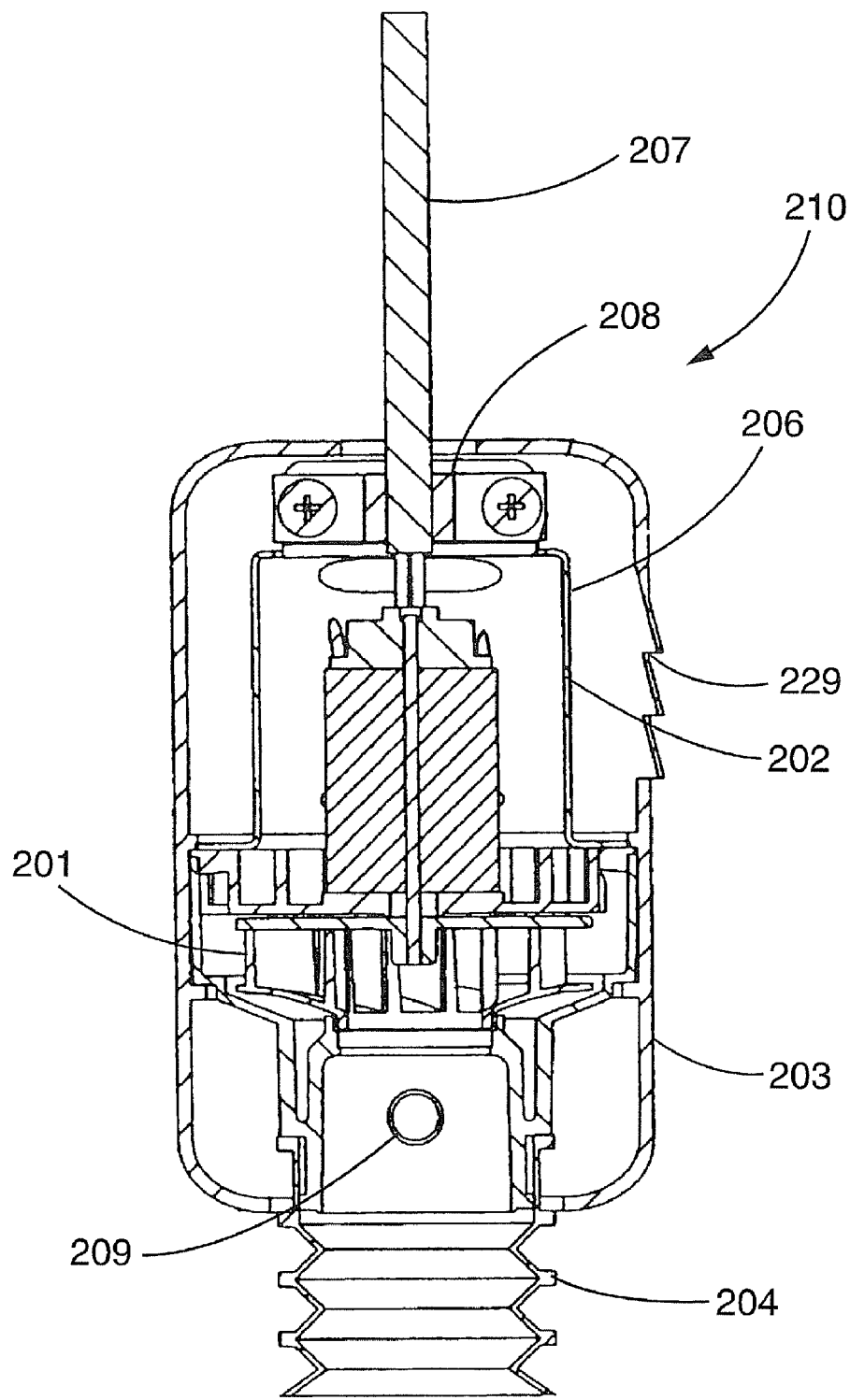
FIG. 5 is a cross-sectional view of another embodiment of a vacuum picker head portion.

Another embodiment of a vacuum picker head assembly 210 is shown in FIG. 5. This embodiment is similar to the embodiment describe above. The vacuum picker head assembly 210 may comprise a vacuum pump with an impeller (or rotor) 201 and motor drive assembly 202 for driving the impeller (or rotor) 201. The vacuum picker head assembly may also comprise a housing 203, suction cup 204, and one or more ventilation features 229. The vacuum picker head assembly 210 may have a bracket 206 coupled to a cable 207 by means of a clamp 208 to help remove excess load from the wiring in the cable 207.

The vacuum picker head assembly 210 may comprise a vacuum break valve 209 to break the vacuum and immediately release the product. The vacuum break valve 209 may be an electronically controlled valve, such as, but not limited to, a solenoid driven valve. Located within the picker head 210 and within close proximity of the product, the vacuum break valve 209 is highly responsive and allows for precise control over the vacuum.

Figure 6:
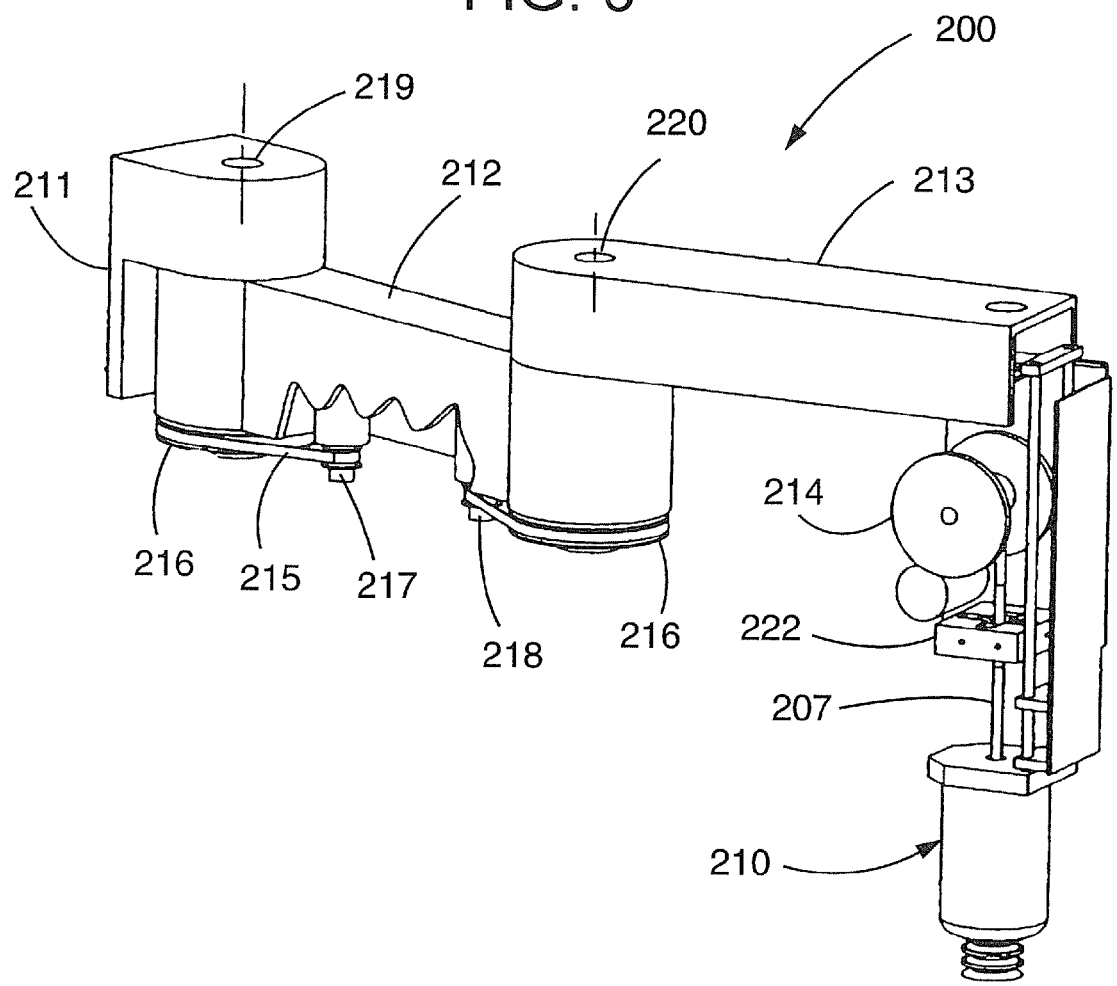
FIG. 6 is a perspective view of another embodiment of a delivery system.

As shown in FIG. 6, the delivery system 200 may include the vacuum picker head assembly 210 coupled to a robotic manipulator. The robotic manipulator of the delivery system 200 may include a main arm segment 212 that links to the mount 211 and pivots about a rotational joint 219 to provide a range of yaw rotation. A second arm segment 213 may be linked to the main arm segment and may be pivoted about an additional rotational joint 220 to provide a yaw range of rotation independent of the main arm segment 212. In this manner, the robotic manipulator can extend into a long reach or fold back on itself to position the vacuum picker head 210 to any suitable position. The robotic manipulator may also include pulleys 216, belts 215, motors 217, 218, motor driven reel 214, and guide 222.

Figure 7:
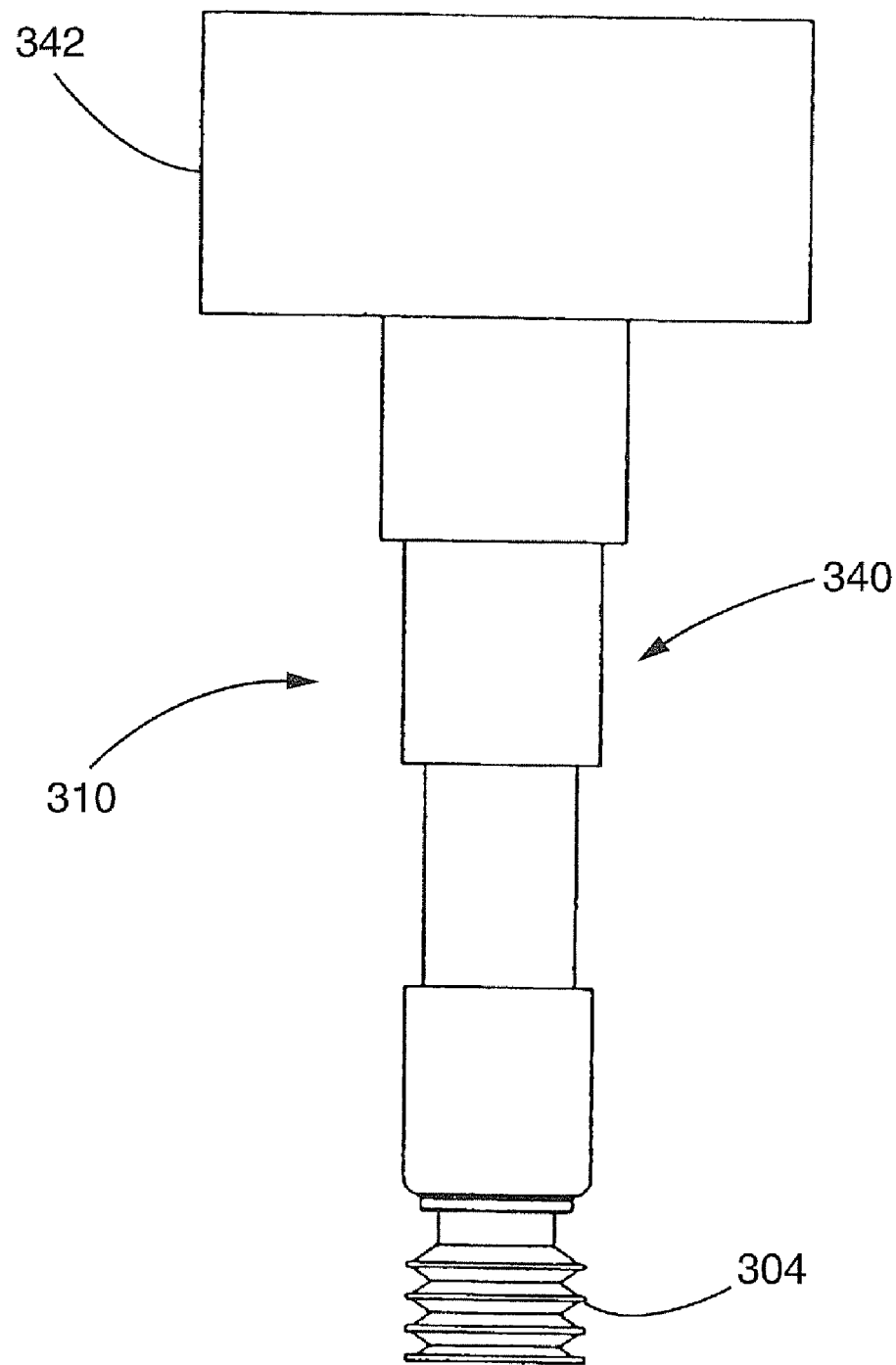
FIG. 7 is a side view of another embodiment of a vacuum picker head portion.
Figure 8:
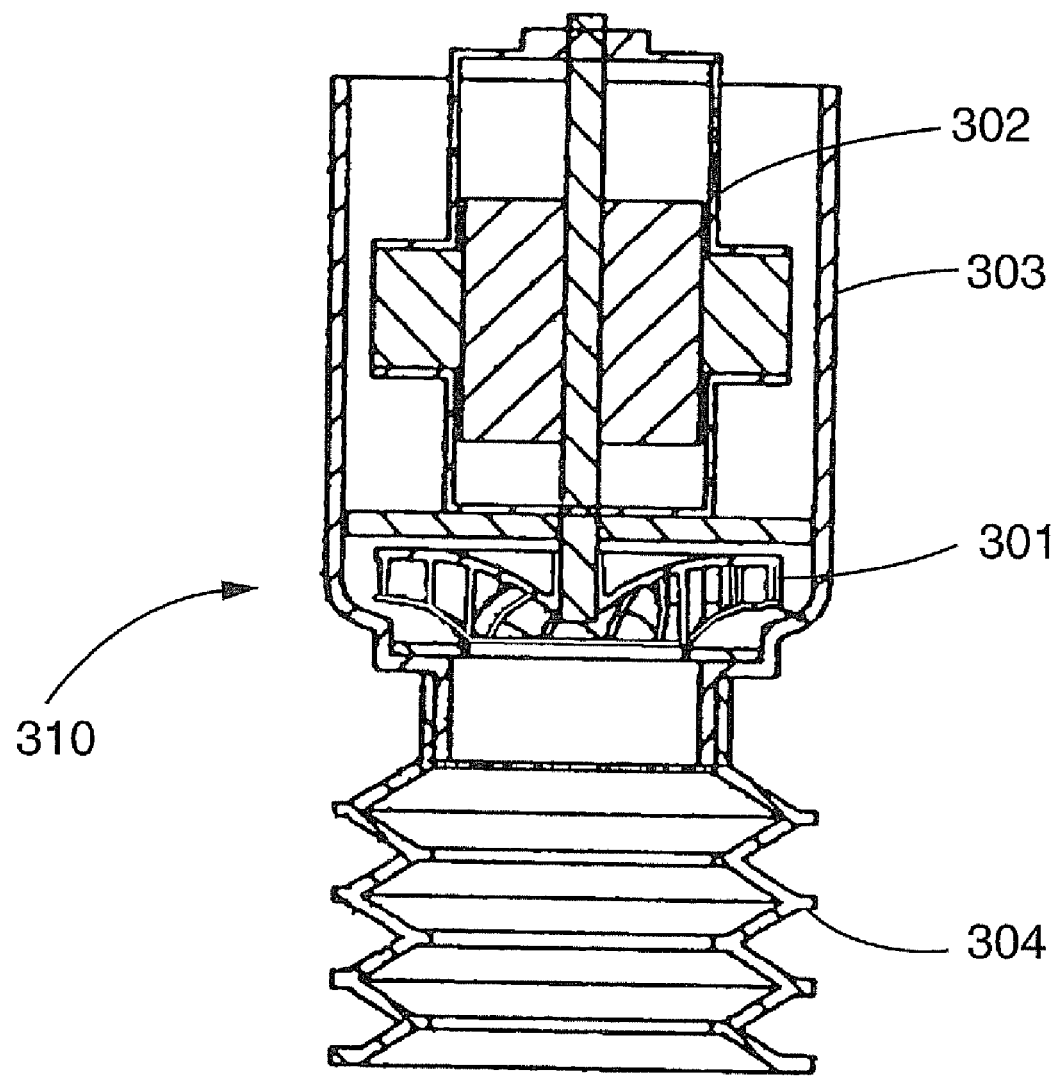
FIG. 8 is a fragmentary cross-sectional view of the vacuum picker head portion of FIG. 7.
Figure 9:
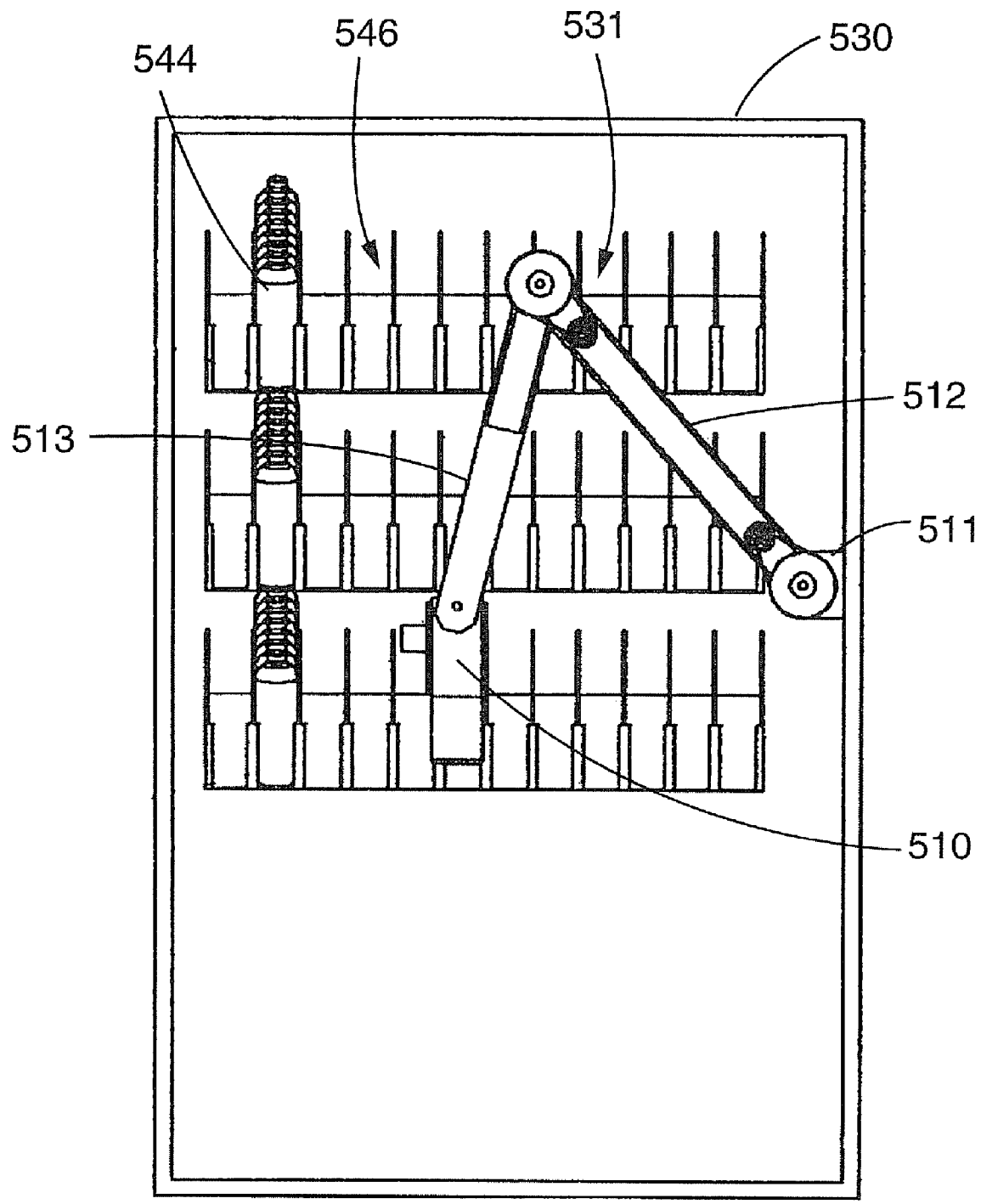
FIG. 9 is a front side view of another embodiment of a delivery system, the delivery system being disposed within a vending machine.

Referring to FIG. 7, vacuum picker head 310 may be coupled to a telescoping arm 340 for moving the suction cup 304. The telescoping arm 340 may be moved by any suitable structure, including but not limited to, a drive system 342. FIG. 8 shows the vacuum picker head 310 in more detail. As shown, the vacuum picker head 310 may include an impeller (or rotor) 301, a motor 302, a housing 303, and a suction cup 304.

Figure 10:
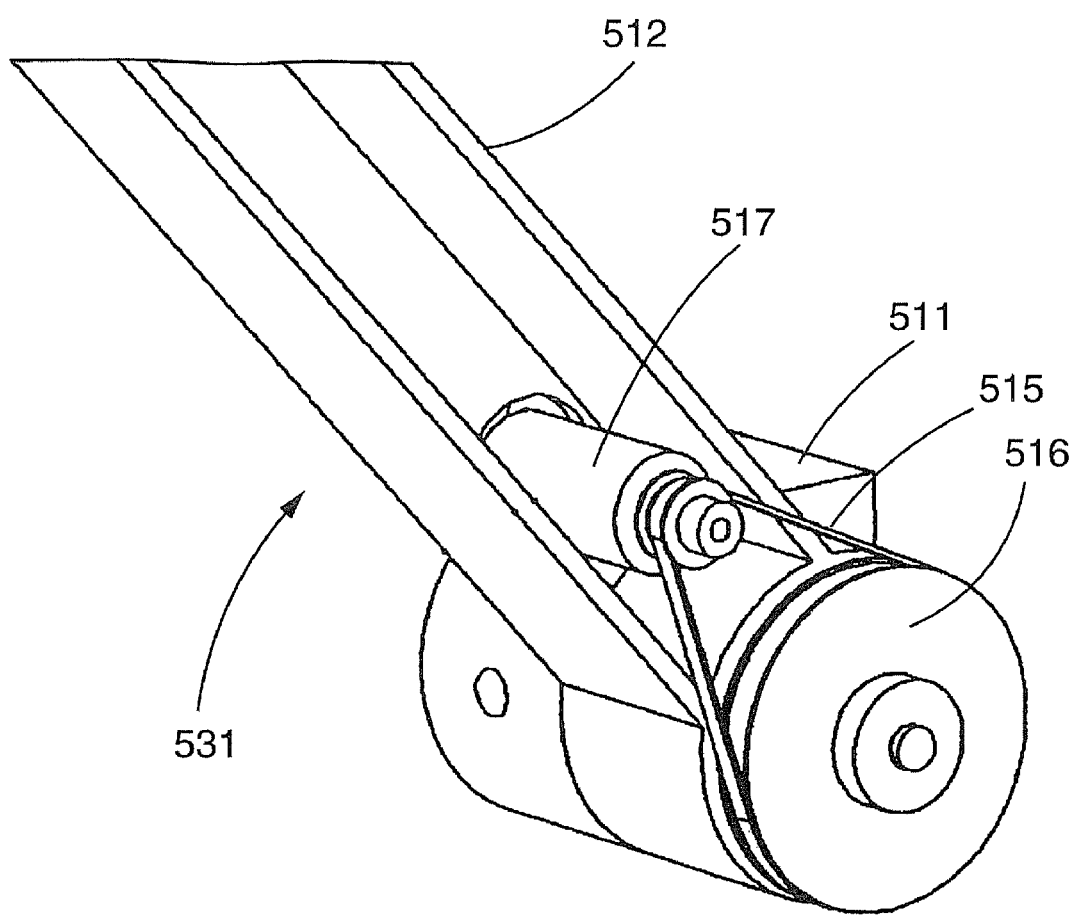
FIG. 10 is an enlarged fragmentary view of an arm joint for the delivery system of FIG. 9.
Figure 11:
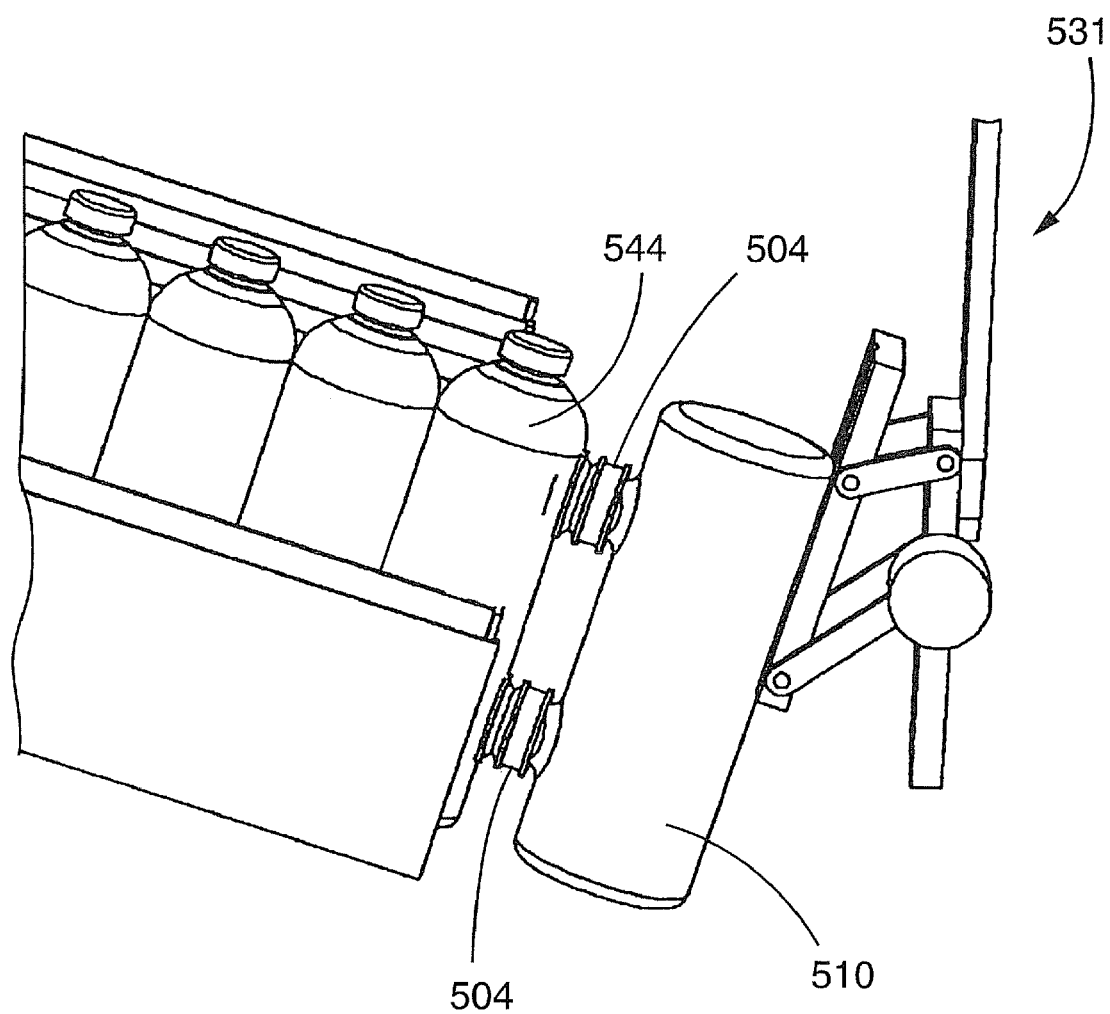
FIG. 11 is an enlarged side view of a vacuum picker head portion for the delivery system of FIG. 9.
Figure 12:
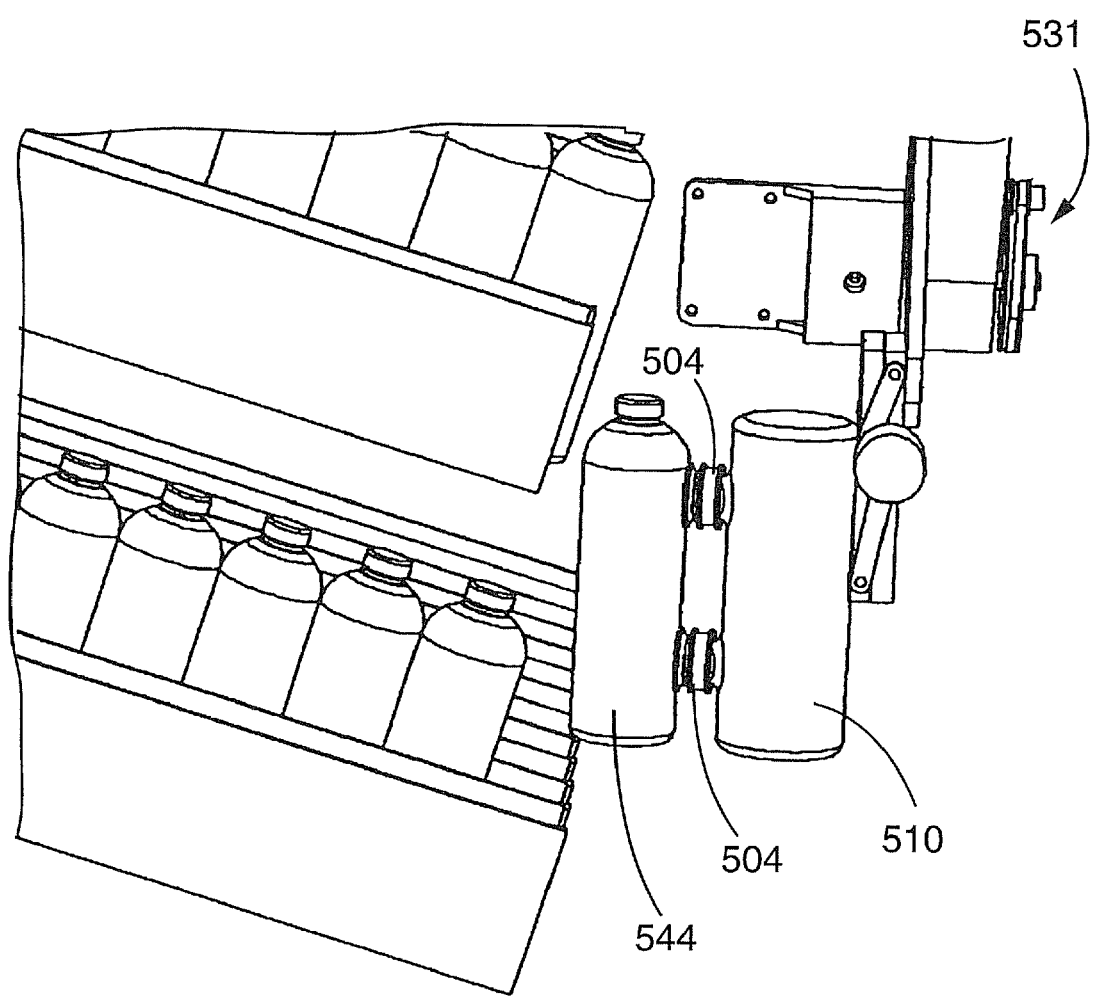
FIG. 12 is another enlarged side view of the vacuum picker head portion for the delivery system of FIG. 9.
Figure 13:
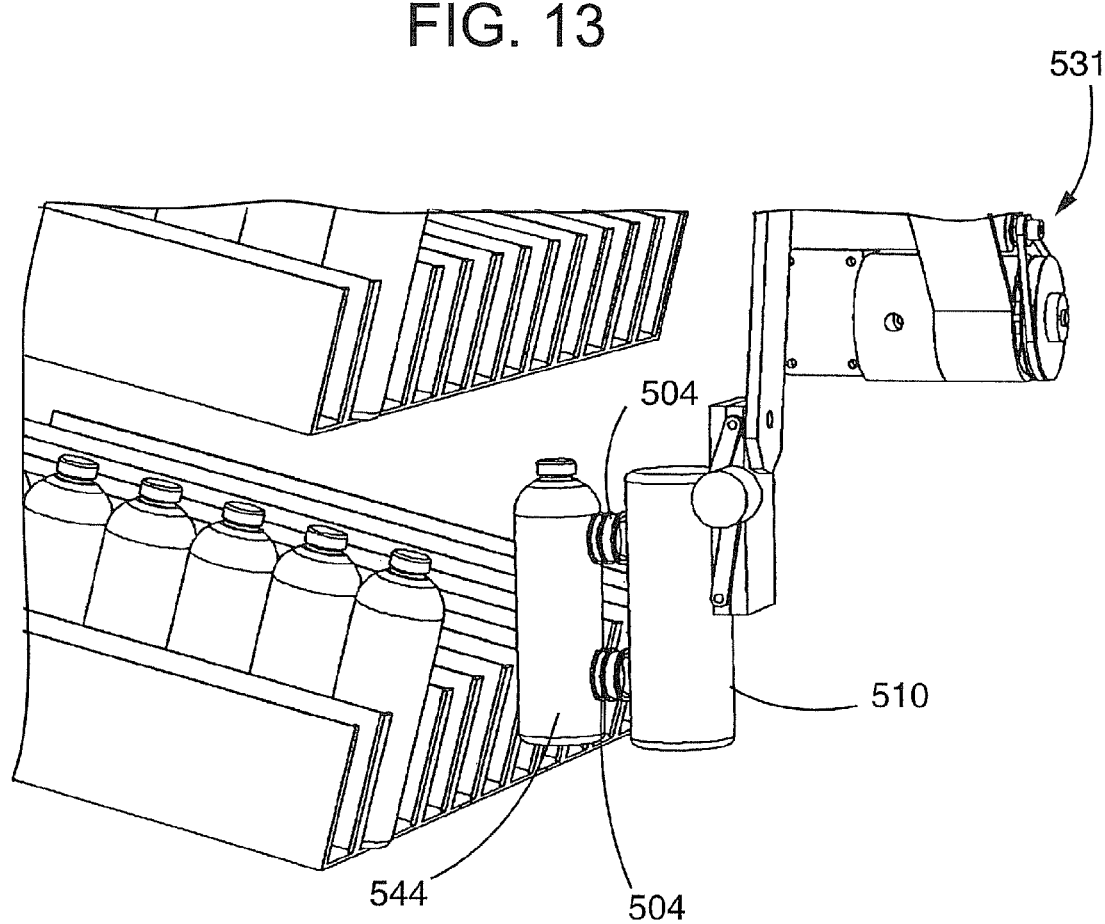
FIG. 13 is an enlarged perspective view of the vacuum picker head portion for the delivery system of FIG. 9.
Figure 14:
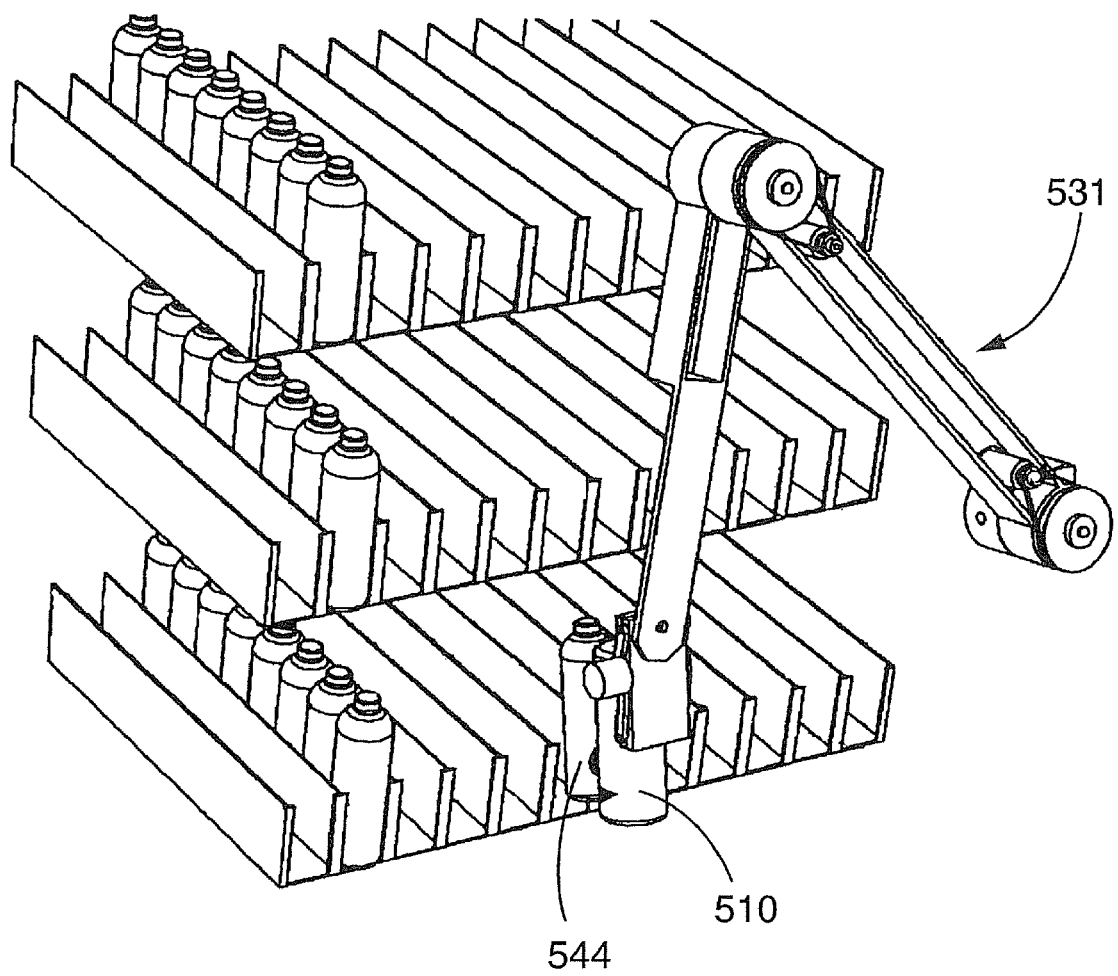
FIG. 14 is a perspective view of the delivery system of FIG. 9.

FIGS. 9-14 show another embodiment of a delivery system, the delivery system being shown for example in a vending machine 530 containing racks 546 and product 544. The robotic manipulator 531 may comprise a mount 511 and arm segments 512, 513. The robotic manipulator 531 is disposed to access vertically oriented product 544. FIG. 10 shows the arm segment 512 coupled to the motor 517, the pulley 516, and the belt 515.

In this embodiment, the robotic manipulator 531 generally imitates the dexterity and gripping function of a human hand. As shown in this embodiment, more than one suction cup 504 coupled to the vacuum picker head assembly 510 may be used to move product 544. Having multiple suction cups 504 may provide additional secure gripping of a product. Referring to FIGS. 11-14, the vacuum picker head assembly 510 may be coupled to a pivoting structure for advancing the vacuum picker head assembly 510 toward a product. As shown, the pivoting structure may have one or more pivotable links, and the links may have different sizes to advance the vacuum picker head assembly 510 at a desired angle for contacting the product. The links may also be disposed such that the product can be released generally vertically.

It will be appreciated that reliable product pick-up may be detected by limit switches, vacuum detecting sensors, current detecting sensors, and/or any other suitable device.

It will be appreciated that the freedom of movement of the robotic arm provides a faster, more flexible, and more precise motion to deliver product than standard Cortesian coordinate positioning systems. Furthermore, the relatively small number of components that form the delivery system, their general modularity, and their ease of access make the delivery system easy to repair and maintain.

The following examples further illustrate the delivery system but, of course, should not be construed as in any way limiting its scope.

One example of the operation of the delivery system is particularly applicable to frozen product dispensing where the product is commonly stored within a chest such as a freezer and wherein different products bins are matrixed in a side-to-side and front-to-back layout, and within each bin a product type is stored in a vertically oriented manner. In this example, the delivery system may be located above the product bin. The delivery system may operate as follows: from a starting position, by means of the controller, the robotic manipulator arm segments may be rotated about the rotational joints to position the vacuum picker head above the desired product storage bin. The controller activates the vacuum pump and unwinds the reel to thereby extend the cable and lower the vacuum picker head. The suction cup of the vacuum picker head may contact the product and a suction force may be created to hold the product. The controller can detect a change in the current draw of the vacuum pump, and thus, satisfy the condition that the product is held. The controller may then spool the reel to thereby retract the cable and raise the vacuum picker head. The controller may reposition the robotic manipulator arm segments so that the vacuum picker head is positioned above the dispensing area. The controller may then unwind the reel to extend the cable and lower the vacuum picker head. The controller may cut the power to the vacuum pump to release the product such that the product is dropped into the dispensing area. The controller then can spool the reel to retract the cable and raise the vacuum picker head. The robotic manipulator may then be relocated to its starting position or some other suitable position.

Another example of the operation of the delivery system is particularly suited to bottled and canned beverage product dispensing. In this example, the delivery system may be located near the front-most portion of a product storage system wherein the different bottle and/or can types are matrixed in a side-to-side and top-to-bottom layout, and each can or bottle type is stored in a front-to-back manner (as is often the placement in glass front vending machines). This particular application may not utilize the reel and cable system explained above. The delivery system may operate as follows: from a starting position, by means of the controller, the robotic manipulator arm segments can be rotated about the rotational joints to position the vacuum picker head in front of the desired product. The controller may activate the vacuum pump, and the controller may further rotate the arm segments of the robotic manipulator. The suction cup of the vacuum picker head may contact the product and a suction force is created to hold the product. The controller may detect a change in the current draw of the vacuum pump, and thus, satisfy the condition that the product is held. The controller may then reposition the robotic manipulator arm segments such that the vacuum picker head is positioned near the dispensing area. The controller may then cut the power to the vacuum pump to release the product such that the product is dropped into the dispensing area. The robotic manipulator may then be relocated to its starting position or some other suitable position.

Another example of the operation of the delivery system, which does not utilize the robotic manipulator, is described below. In this example, different product type bins may be laid out in a single side-to-side row, and within each bin, the product may be stored vertically. The present invention may be located above the row of storage bins. The cable and reel assembly may be mounted to a device that provides linear motion, such as a carriage mechanism, to position the vacuum picker head. The delivery system may operate as follows: from a starting position, by means of the controller, the vacuum picker head may be positioned above the desired product. The controller may activate the vacuum pump and unwind the reel to extend the cable and lower the vacuum picker head. The suction cup of the vacuum picker head may contact the product and a suction force may be created to hold the product. The controller may detect a change in the current draw of the vacuum pump, and thus, satisfying the condition that product is held. The controller may then spool the reel to thereby retract the cable and raise the vacuum picker head. The vacuum picker head may be positioned above the dispensing area. The controller may then unwind the reel to thereby extend the cable and lower the vacuum picker head. The controller may then cut the power to the vacuum pump to release the product such that it is dropped into the dispensing area. The controller may spool the reel to thereby retract the cable and raise the vacuum picker head. The vacuum picker head may then be relocated to its starting position or another suitable position.

The above described examples are provided solely for demonstration of suitable applications of the delivery system It will be appreciated that the delivery system may be utilized in any suitable application and in any suitable manner. Significantly, an important aspect is elimination of remote vacuum source pumps and extended flexible hoses thereby enabling a picker that may be used for many different applications.

The delivery system offers the advantage of reducing the number of components and material required to achieve the functionality of a product delivery system. The delivery system also provides an economical design that is easy to service and refurbish. Another unique aspect of the delivery system is the increased precision and reliability offered by the embodiments disclosed herein, which results in reduced occurrences of unintentional product drops.

Another unique advantage of the delivery system is that the arm segments of the robotic manipulator are adjustable in length so that during the assembly process, the reach of the robotic manipulator can be set to suit a particular application. In this fashion, a single set of components can be configured for a range of applications that may each have different range of reach requirements for the robotic manipulator.

Various embodiments of a delivery system have been described herein. It will be appreciated that any suitable features described with respect to a particular embodiment may be utilized with any other suitable embodiment.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A product delivery system for delivering product from a storage area to a dispensing area, the product delivery system comprising:
   a product holding device for selective coupling with the product, the product holding device being modular, compact, and elongated, the product holding device having a self-contained electric motor driven rotary vacuum generating assembly;
   a robotic arm positioning structure coupled to the product holding device for moving the product holding device, the robotic arm positioning structure having a plurality of arm segments wherein each arm segment is joined to an adjacent arm segment by a rotary driven joint, the robotic arm positioning structure having an end and the entire product holding device being attached near the end, the positioning structure being capable of non-Cartesian coordinate movement;

a reel and cable system, wherein the product holding device is moveable with the reel and cable system, the reel and cable system including a cable that is spooled onto a reel, the product holding device being attached to a cable end, the cable supporting the product holding device, the cable being wound onto the reel to raise the product holding device and the cable being unwound from the reel to lower the product holding device, and an integrated electrical conductor within the cable to electrically power the self-contained electric motor driven rotary vacuum generating assembly of the product holding device; and a control system for controlling the product holding device and the positioning structure, wherein the control system continuously monitors an electrical current draw of the vacuum generating assembly to determine when the product holding device has coupled to a product and when a product has been released.

2. A product delivery system as claimed in claim 1 wherein the product holding device is telescoping.

3. A product delivery system as claimed in claim 1 further comprising a mounting component for the positioning structure.

4. A product delivery system as claimed in claim 1 wherein the vacuum generating assembly includes an air vacuum pumping mechanism, a drive mechanism to drive the pumping mechanism, air ducting components, and a housing assembly.

5. A product delivery system as claimed in claim 1 wherein the vacuum generating assembly includes a suction cup for contacting the product, the suction cup being flexible to generally conform to an exterior surface of the product.

6. A product delivery system as claimed in claim 1 wherein the vacuum generating assembly includes a housing, the housing having an exhaust for exiting air substantially proximate to the housing.

7. A product delivery system as claimed in claim 1 wherein the vacuum generating assembly is detachable from the positioning structure as a modular unit.

8. A product delivery system as claimed in claim 1 wherein the product delivery system is retrofittable into an existing vending machine.

9. A product delivery system as claimed in claim 1 wherein the reel and cable system is operated with a drive system to vertically position the product holding device.

10. A product delivery system as claimed in claim 1 wherein the reel and cable assembly is coupled to the positioning structure.

11. A product delivery system as claimed in claim 1 wherein the control system includes a means for ramping up the power level provided to the air vacuum generating assembly during activation of the vacuum generating assembly, and the control system includes a means for ramping down the power level provided to the air vacuum generating assembly during the deactivation of the vacuum generating assembly.

12. A product delivery system as claimed in claim 1 wherein the control system comprises a closed loop feedback monitoring feature for rotational orientation of the positioning structure to provide precise rotational orientation positioning of the positioning structure.

13. A product delivery system as claimed in claim 1 wherein the cable is electrically coupled to the positioning structure by a slip ring conductor.

14. A product delivery system as claimed in claim 1 wherein the vacuum generating assembly includes a plurality of suction cups for contacting the product, the suction cups being flexible to generally conform to an exterior surface of the product.

15. A product delivery system as claimed in claim 1 wherein the product holding device includes an impeller for generating a vacuum.

16. A product delivery system as claimed in claim 1 wherein the product holding device includes a vacuum break valve to release a vacuum generated by the self-contained motor driven rotary vacuum generating assembly.

17. A product delivery system as claimed in claim 1 wherein the product holding device includes a rotary vane pump.

18. A product delivery system as claimed in claim 1 wherein each rotary driven joint has a motor for driving the joint.

19. A product delivery system for delivering product from a storage area to a dispensing area, the product delivery system comprising:

a product holding device for selective coupling with the product, the product holding device being modular, compact, and elongated, the product holding device having a self-contained electric motor driven rotary vacuum generating assembly;

a robotic arm positioning structure coupled to the product holding device for moving the product holding device, the robotic arm positioning structure having a plurality of arm segments wherein each arm segment is joined to an adjacent arm segment by a rotary driven joint, the robotic arm positioning structure having an end and the entire product holding device being attached near the end, the positioning structure being capable of non-Cartesian coordinate movement;

a reel and cable system, wherein the product holding device is moveable with the reel and cable system, the reel and cable system including a cable that is spooled onto a reel, the product holding device being attached to a cable end, the cable supporting the product holding device, the cable being wound onto the reel to raise the product holding device and the cable being unwound from the reel to lower the product holding device, and an integrated electrical conductor within the cable to electrically power the self-contained electric motor driven rotary vacuum generating assembly of the product holding device; and a control system for controlling the product holding device and the positioning structure, wherein the control system includes a means for ramping up the power level provided to the air vacuum generating assembly during activation of the vacuum generating assembly, and the control system includes a means for ramping down the power level provided to the air vacuum generating assembly during the deactivation of the vacuum generating assembly.

20. A product delivery system as claimed in claim 19 wherein the vacuum generating assembly is detachable from the positioning structure as a modular unit.

21. A product delivery system as claimed in claim 19 wherein the reel and cable system is operated with a drive system to vertically position the product holding device.

22. A product delivery system as claimed in claim 19 wherein the cable is electrically coupled to the positioning structure by a slip ring conductor.

23. A product delivery system as claimed in claim 19 wherein the product holding device includes a rotary vane pump.

24. A product delivery system for delivering product from a storage area to a dispensing area, the product delivery system comprising:
- a product holding device for selective coupling with the product, the product holding device being modular, compact, and elongated, the product holding device having a self-contained electric motor driven rotary vacuum generating assembly;
- a robotic arm positioning structure coupled to the product holding device for moving the product holding device, the robotic arm positioning structure having a plurality of arm segments wherein each arm segment is joined to an adjacent arm segment by a rotary driven joint, the robotic arm positioning structure having an end and the entire product holding device being attached near the end, the positioning structure being capable of non-Cartesian coordinate movement;
- a reel and cable system, wherein the product holding device is moveable with the reel and cable system, the reel and cable system including a cable that is spooled onto a reel, the product holding device being attached to a cable end, the cable supporting the product holding device, the cable being wound onto the reel to raise the product holding device and the cable being unwound from the reel to lower the product holding device, and an integrated electrical conductor within the cable to electrically power the self-contained electric motor driven rotary vacuum generating assembly of the product holding device; and
- a control system for controlling the product holding device and the positioning structure, wherein the control system comprises a closed loop feedback monitoring feature for rotational orientation of the positioning structure to provide precise rotational orientation positioning of the positioning structure.

25. A product delivery system as claimed in claim 24 wherein the vacuum generating assembly is detachable from the positioning structure as a modular unit.

26. A product delivery system as claimed in claim 24 wherein the reel and cable system is operated with a drive system to vertically position the product holding device.

27. A product delivery system as claimed in claim 24 wherein the cable is electrically coupled to the positioning structure by a slip ring conductor.

28. A product delivery system as claimed in claim 24 wherein the product holding device includes a rotary vane pump.

* * * * *